US011153878B2

(12) United States Patent
Tang

(10) Patent No.: US 11,153,878 B2
(45) Date of Patent: Oct. 19, 2021

(54) INFORMATION TRANSMISSION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 190 days.

(21) Appl. No.: 16/456,112

(22) Filed: Jun. 28, 2019

(65) Prior Publication Data

US 2019/0320427 A1    Oct. 17, 2019

Related U.S. Application Data

(63) Continuation of application No. PCT/CN2016/113681, filed on Dec. 30, 2016.

(51) Int. Cl.
*H04B 7/0408* (2017.01)
*H04B 7/08* (2006.01)
(Continued)

(52) U.S. Cl.
CPC ....... *H04W 72/046* (2013.01); *H04W 72/042* (2013.01); *H04W 72/1273* (2013.01); *H04W 76/27* (2018.02)

(58) Field of Classification Search
CPC ............... H04W 72/046; H04W 76/27; H04W 72/1273; H04W 76/042; H04L 1/16; H04B 7/088
See application file for complete search history.

(56) References Cited

U.S. PATENT DOCUMENTS

2013/0040684 A1   2/2013 Yu et al.
2013/0286960 A1   10/2013 Li et al.
(Continued)

FOREIGN PATENT DOCUMENTS

CN   103875190 A   6/2014
CN   103918196 A   7/2014
(Continued)

OTHER PUBLICATIONS

Samsung, 3GPP TSG RAN WG1 #85 R1-164013; Framework for beamformed access, Nanjing, China, May 23-27, 2016.
(Continued)

*Primary Examiner* — Faruk Hamza
*Assistant Examiner* — Abusayeed M Haque
(74) *Attorney, Agent, or Firm* — Ladas & Parry LLP

(57) ABSTRACT

Embodiments of the present application provide an information transmission method, a network device, and a terminal device, which can improve downlink receiving performance. A network device sends indication information to a terminal device, where the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information includes at least one of: information of at least one transmitting beam, information of a receiving beam corresponding to the at least one transmitting beam, and resource mapping information, where the resource mapping information indicates a resource available or unavailable for downlink transmission of the at least one transmitting beam; the network device transmits the downlink transmission channel through the beam corresponding to the downlink transmission channel.

33 Claims, 4 Drawing Sheets

(51) Int. Cl.
*H04W 72/04* (2009.01)
*H04W 76/27* (2018.01)
*H04W 72/12* (2009.01)

(56) References Cited

U.S. PATENT DOCUMENTS

| | | | |
|---|---|---|---|
| 2014/0187168 A1 | 7/2014 | Seol et al. | |
| 2015/0333811 A1* | 11/2015 | Yu | H04B 7/0617 370/329 |
| 2016/0072568 A1* | 3/2016 | Mun | H04B 7/0619 375/267 |
| 2017/0111886 A1* | 4/2017 | Kim | H04W 72/042 |
| 2017/0134080 A1* | 5/2017 | Rahman | H04B 7/0456 |
| 2018/0294859 A1* | 10/2018 | Niu | H04L 5/0048 |
| 2018/0309496 A1* | 10/2018 | Lee | H04L 5/0023 |
| 2019/0013983 A1* | 1/2019 | Gao | H04L 27/2655 |
| 2019/0309496 A1* | 10/2019 | Evirgen | E02D 5/803 |
| 2021/0076397 A1* | 3/2021 | Xiong | H04B 7/0695 |

FOREIGN PATENT DOCUMENTS

| | | |
|---|---|---|
| CN | 104734760 A | 6/2015 |
| CN | 105812035 A | 7/2016 |
| CN | 106170930 A | 11/2016 |
| CN | 108141299 A | 6/2018 |
| JP | 2014526837 A | 10/2014 |
| KR | 102006009410 A | 9/2006 |
| RU | 2446596 C2 | 3/2012 |
| WO | 2008058149 A2 | 5/2008 |
| WO | 2009023681 A2 | 2/2009 |
| WO | 2013039352 A2 | 3/2013 |
| WO | 2015103596 A1 | 7/2015 |
| WO | 2016153399 A1 | 9/2016 |

OTHER PUBLICATIONS

Intel Corporation, 3GPP TSG-RAN WG1 #86 R1-167128; Discussion on UL beam management in multi-beam operation, Gothenburg, Sweden, Aug. 22-26, 2016.

Ericsson, 3GPP TSG-RAN WG1 #86 R1-167466; Key principles for beam management, Göteborg, Sweden, Aug. 22-26, 2016.

The First Office Action of corresponding Canadian application No. 3048927, dated Aug. 24, 2020.

The First Office Action of corresponding Singaporean application No. 11201906067Q, dated Aug. 5, 2020.

The First Office Action of corresponding Brazilian application No. BR1120190136711, dated Sep. 15, 2020.

The First Office Action of corresponding Chilean application No. 201901812, dated May 14, 2020.

The second Office Action of corresponding Chinese application No. 201680091907.0, dated Jun. 23, 2020.

International Search Report (ISR) and Written Opinion (WO) dated Sep. 20, 2017 for Application No. PCT/CN2016/113681.

Extended European Search Report dated Nov. 18, 2019 for Appln. No. EP 16925174.1.

Nokia et al: "On beam management in NR-procedures"; R1-1610239 (3GPP); Mobile Competence Centre; 650, Route Des Lucioles; F-06921 Sophia-Antipolis Cedex France, vol. RAN WG1, No. Lisbon, Portugal; Oct. 10, 2016-Oct. 14, 2016, Sep. 30, 2016 (Sep. 30, 2016); XP051158645.

ZTE ZTE Microelectronics:"Beam management for Control Channel" (3GPP); Mobile Competence Centre; 650, Route Des Lucioles; F-06921 Sophia-Antipolis Cedex; France, vol. RAN WG1, No. Reno, USA; Nov. 14, 2016-Nov. 18, 2016; Nov. 13, 2016 (Nov. 13, 2016); XP051175401.

Huawei et al: "Disscussion on beam management aspects for DL MIMO", R1-1611670 (3GPP); Mobile Competence Centre; 650, Route Des Lucioles; F-06921 Sophia-Antipolis Cedex; France; vol. RAN WG1, No. Reno, USA; Nov. 14, 2016-Nov. 18, 2016; Nov. 5, 2016 (Nov. 5, 2016); XP051190074.

CATT: "On beam management procedures", R1-1608773 (3GPP); Mobile Competence Centre; 650, Route Des Lucioles; F-06921 Sophia-Antipolis Cedex; France; vol. RAN WG1, No. Lisbon, Portugal; Oct. 10, 2016-Oct. 14, 2016; Oct. 1, 2016 (Oct. 1, 2016); XP051159120.

ZTE, ZTE Microelectronics, ASTRI, Intel, 3GPP TSG RAN WG1 Meeting #87 R1-1613365, Way Forward on beam management for data and control channel, published on Nov. 18, 2016.

Ericsson, 3GPP TSG-RAN WG1 Meeting #87 R1-1611916, Enabling beam grouping by UE in mobility RS measurements, published on Nov. 18, 2016.

First Office Action in corresponding Russian application No. 2019123721/07, dated Feb. 26, 2020.

First Office Action in corresponding Chinese application No. 201680091907.0, dated Mar. 19, 2020.

English abstract of RU 2446596 C2.

The first Office Action of corresponding Indian application No. 201917029729, dated Mar. 12, 2021, The first Office Action of corresponding Japanese application No. 2019-536026, dated Mar. 26, 2021.

The EESR of corresponding European application No. 21153821.0, dated May 25, 2021.

The first Office Action of corresponding Israeli application No. 267721, dated Jun. 24, 2021.

\* cited by examiner

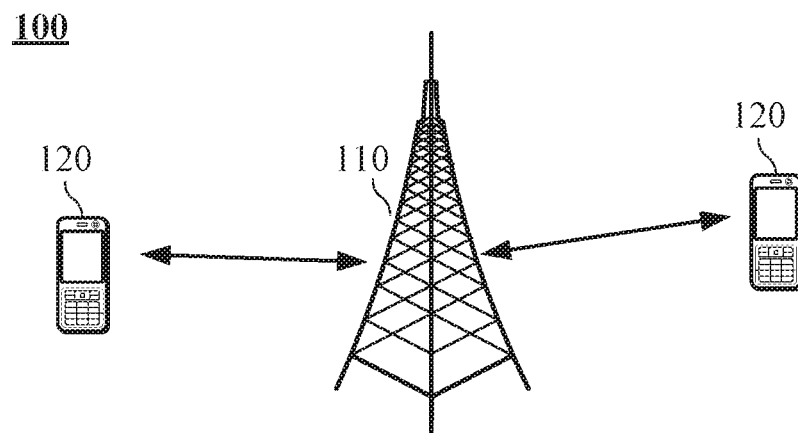

A network device sends indication information to a terminal device, where the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information includes at least one of: information of at least one transmitting beam, information of a receiving beam corresponding to the at least one transmitting beam, and resource mapping information, where the resource mapping information indicates a resource available or unavailable for downlink transmission of the at least one transmitting beam ⎯201

The network device transmits the downlink transmission channel through the beam corresponding to the downlink transmission channel ⎯202

301 A terminal device receives indication information sent by a network device, where the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information includes at least one of: information of at least one transmitting beam, information of a receiving beam corresponding to the at least one transmitting beam, and resource mapping information, where the resource mapping information indicates a resource available or unavailable for downlink transmission 302 The terminal device determines a receiving beam corresponding to the downlink transmission channel according to the indication information 303 The terminal device receives the downlink transmission channel through the receiving beam corresponding to the downlink transmission channel

FIG. 3

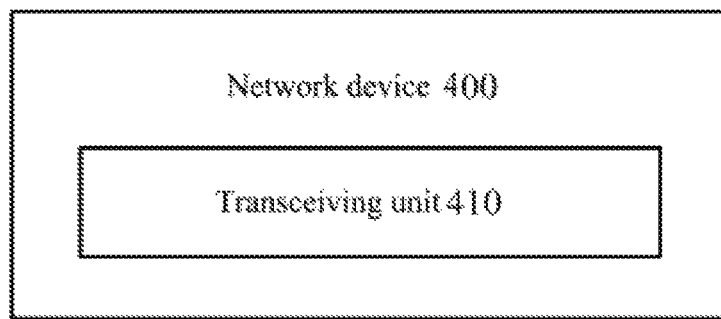

FIG 4

INFORMATION TRANSMISSION METHOD, NETWORK DEVICE, AND TERMINAL DEVICE

CROSS-REFERENCE TO RELATED APPLICATIONS

This application is a continuation of International Application No. PCT/CN2016/113681 filed on Dec. 30, 2016, the content of which is incorporated herein by reference in its entirety.

TECHNICAL FIELD

The present application relates to the field of communications and, in particular, to an information transmission method, a network device, and a terminal device.

BACKGROUND

In a 5G system which also may be termed as a New Radio (NR) system, multiple-beam can be used to cover different directions and regions. For downlink transmission, different downlink transmitting beams of a network device may correspond to different receiving beams of a terminal device for the best match. For example, in the case where the best receiving beam for two transmitting beams of the Transmission Reception Point (TRP for short) 1 of the network device is the beam 1 of the terminal device, the receiving performance will be poor if the terminal device uses the beam 2 to receive a signal transmitted by any one of the transmitting beams of the TRP1. Similarly, in a case where the best receiving beam for two transmitting beams of the TRP2 of the network device is the beam 2 of the terminal device, the receiving performance will be poor if the terminal device uses the beam 1 to receive a signal transmitted by any one of the transmitting beams of the TRP2. Therefore, it is desirable that an indication method can indicate a beam corresponding to a downlink transmission channel, thereby improving downlink receiving performance.

SUMMARY

Embodiments of the present application provide an information transmission method, a network device, and a terminal device, according to Which the terminal device can be notified of a beam corresponding to a downlink transmission channel, thereby improving downlink receiving performance.

In a first aspect, an information transmission method is provided, including: sending, by a network device, indication information to a terminal device, where the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information includes at least one of: information of at least one transmitting beam, information of a receiving beam corresponding to the at least one transmitting beam, and resource mapping information, where the resource mapping information indicates a resource available or unavailable for downlink transmission of the at least one transmitting beam; and transmitting, by the network device, the downlink transmission channel through the beam corresponding to the downlink transmission channel.

In an embodiment, each piece of configuration information corresponds to one beam group, and information of each transmitting beam among the information of the at least one transmitting beam includes at least one of the following: identification information of each transmitting beam, resource occupying information specific to each transmitting beam, and a number for each transmitting beam in the beam group corresponding to each piece of configuration information.

In an embodiment, the information of the receiving beam corresponding to the at least one transmitting beam includes identification information of the receiving beam corresponding to the at least one transmitting beam.

In an embodiment, the resource mapping information includes at least one piece of data transmission resource mapping information, each piece of data transmission resource mapping information indicates a resource available or unavailable for downlink transmission of the at least one transmitting beam.

In an embodiment, the downlink transmission channel includes a data channel, the beam corresponding to the downlink transmission channel includes a transmitting beam corresponding to the data channel, and the sending, by the network device, the indication information to the terminal device includes: sending, by the network device, a physical downlink control channel PDCCH to the terminal device through a beam in a first beam group, where a first indication field of the PDCCH includes the indication information, the indication information includes a number for the transmitting beam corresponding to the data channel, the indication information specifically indicates that the network device sends the data channel by using the transmitting beam corresponding to the number in the first beam group, first configuration information of the multiple pieces of configuration information corresponds to the first beam group, the first configuration information is configuration information pre-configured by the network device for the terminal device to receive the data channel.

In an embodiment, the method further includes: sending, by the network device, a first signaling to the terminal device, where the first signaling includes first configuration indication information, and the first configuration indication information indicates that the network device sends the data channel by using the first configuration information of the multiple pieces of configuration information.

In an embodiment, the first signaling is a radio resource control RRC signaling or downlink control information DCI.

In an embodiment, the downlink transmission channel includes a data channel, the beam corresponding to the downlink transmission channel includes a receiving beam corresponding to the data channel, and the sending, by the network device, the indication information to the terminal device includes: sending, by the network device, a PDCCH to the terminal device through a beam in a second beam group, where a second indication field of the PDCCH includes the indication information, the indication information includes identification information of the receiving beam corresponding to the data channel, the indication information specifically indicates that the terminal device receives the data channel by using a receiving beam corresponding to the identification information.

In an embodiment, the downlink transmission channel includes a data channel, the beam corresponding to the downlink transmission channel includes a transmitting beam corresponding to the data channel, and the sending, by the network device, the indication information to the terminal device includes: sending, by the network device, a PDCCH to the terminal device through a beam in a third beam group, where a third indication field of the PDCCH includes the indication information, the indication information includes a number for a beam corresponding to the data channel in a fourth beam group, the indication information specifically indicates that the network device sends the data channel by using the transmitting beam corresponding to the number in the fourth beam group, second configuration information of the multiple pieces of configuration information corresponds to the fourth beam group, the second configuration information is configuration information pre-configured by the network device for the terminal device to receive the data channel.

In an embodiment, the method further includes: sending, by the network device, a second signaling to the terminal device, where the second signaling includes second configuration indication information, and the second configuration indication information indicates that the network device sends the data channel by using the second configuration information of the multiple pieces of configuration information.

In an embodiment, the second signaling is a RRC signaling or DCI.

In an embodiment, the method further includes: sending, by the network device, a PDCCH to the terminal device, where the PDCCH includes third configuration indication information, and the third configuration indication information indicates configuration information used by the network device for sending a data channel.

That is, the third configuration indication information indicates which piece of the multiple pieces of configuration information is used by the network device.

That is, the network device may dynamically indicate, through the PDCCH, the network device uses which piece of the multiple pieces of configuration information to send the data channel.

In an embodiment, the at least one data transmission resource mapping information includes multiple pieces of data transmission resource mapping information, the method further includes: sending, by the network device, a PDCCH to the terminal device, where the PDCCH includes a fourth indication field, and the fourth indication field indicates data transmission resource mapping information used by the network device for transmitting the downlink transmission channel.

That is, the fourth indication field indicates which piece of the multiple pieces of data transmission resource mapping information is used by the network device.

In an embodiment, the downlink transmission channel includes a data channel, the beam corresponding to the downlink transmission channel includes a transmitting beam corresponding to the data channel, and the sending, by the network device, the indication information to the terminal device includes: sending, by the network device, a PDCCH to the terminal device through a beam in a fifth beam group, where a fifth indication field of the PDCCH includes the indication information, the indication information includes a number for a transmitting beam corresponding to the data channel in a sixth beam group, the indication information specifically indicates that the network device sends the data channel by using the transmitting beam corresponding to the number in the sixth beam group, and the fifth beam group is a beam group associated with the sixth beam group.

In an embodiment, the method further includes: sending, by the network device, the multiple pieces of configuration information to the terminal device.

In a second aspect, an information transmission method is provided, including: receiving, by a terminal device, indication information sent by a network device, where the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information includes at least one of: information of at least one transmitting beam, information of a receiving beam corresponding to the at least one transmitting beam, and resource mapping information, where the resource mapping information indicates the resource available or unavailable for downlink transmission; determining, by the terminal device, a receiving beam corresponding to the downlink transmission channel according to the indication information; and receiving, by the terminal device, the downlink transmission channel through the receiving beam corresponding to the downlink transmission channel.

in an embodiment, each piece of configuration information corresponds to one beam group, and information of each transmitting beam among the information of the at least one transmitting beam includes at least one of the following: identification information of each transmitting beam, resource occupying information specific to each transmitting beam, and a number for each transmitting beam in the beam group to which each transmitting beam belongs.

In an embodiment, information of the receiving beam corresponding to the at least one transmitting beam includes identification information of the receiving beam corresponding to the at least one transmitting beam.

In an embodiment, the resource mapping information includes at least one piece of data transmission resource mapping information, each piece of data transmission resource mapping information indicates a resource available or unavailable for downlink transmission of the at least one transmitting beam.

In an embodiment, the downlink transmission channel includes a data channel, the beam corresponding to the downlink transmission channel includes a transmitting beam corresponding to the data channel, and the receiving, by the terminal device, the indication information sent by the network device includes: receiving, by the terminal device, a physical downlink control channel PDCCH sent by the network device through a beam in a first beam group, where a first indication field of the PDCCH includes the indication information, the indication information includes a number for the transmitting beam corresponding to the data channel, the indication information specifically indicates that the network device sends the data channel by using the transmitting beam corresponding to the number in the first beam group, first configuration information of the multiple pieces of configuration information corresponds to the first beam group, the first configuration information is configuration information pre-configured by the network device for the terminal device to receive the data channel;

the determining, by the terminal device, the receiving beam corresponding to the downlink transmission channel according to the indication information includes: determining, by the terminal device, a receiving beam corresponding to the transmitting beam according to the transmitting beam corresponding to the number; and receiving the data channel through the receiving beam corresponding to the transmitting beam.

In an embodiment, the method further includes: receiving, by the terminal device, a first signaling sent by the network device, where the first signaling includes first configuration indication information, and the first configuration indication information indicates that the network device sends the data channel by using the first configuration information of the multiple pieces of configuration information.

In an embodiment, the first signaling is a radio resource control RRC signaling or downlink control information DCI.

In an embodiment, the downlink transmission channel includes a data channel, the beam corresponding to the downlink transmission channel includes a receiving beam corresponding to the data channel, and the receiving, by the terminal device, the indication information sent by the network device includes: receiving, by the terminal device, a PDCCH sent by the network device through a beam in a second beam group, where a second indication field of the PDCCH includes the indication information, the indication information includes identification information of the receiving beam corresponding to the data channel, the indication information specifically indicates that the terminal device receives the data channel by using a receiving beam corresponding to the identification information.

In an embodiment, the downlink transmission channel includes a data channel, the beam corresponding to the downlink transmission channel includes a transmitting beam corresponding to the data channel, and the receiving, by the terminal device, the indication information sent by the network device includes: receiving, by the terminal device, a PDCCH sent by the network device through a beam in a third beam group, where a third indication field of the PDCCH includes the indication information, the indication information includes a number for a beam corresponding to the data channel in a fourth beam group, the indication information specifically indicates that the network device sends the data channel by using the transmitting beam corresponding to the number in the fourth beam group, second configuration information of the multiple pieces of configuration information corresponds to the fourth beam group, the second configuration information is configuration information pre-configured by the network device for the terminal device to receive the data channel.

The determining, by the terminal device, the receiving beam corresponding to the downlink transmission channel according to the indication information includes: determining, by the terminal device, a receiving beam corresponding to the transmitting beam according to the transmitting beam corresponding to the number; and receiving the data channel through the receiving beam corresponding to the transmitting beam.

In an embodiment, the method further includes: receiving, by the terminal device, a second signaling sent by the network device, where the second signaling includes second configuration indication information, and the second configuration indication information indicates that the network device sends the data channel by using the second configuration information of the multiple pieces of configuration information.

In an embodiment, the second signaling is a RRC signaling or DCI.

In an embodiment, the method further includes: receiving, by the terminal device, a PDCCH sent by the network device, where the PDCCH includes third configuration indication information, the third configuration indication information indicates configuration information used by the network device uses for sending a data channel.

That is, the third configuration indication information indicates which piece of the multiple pieces of configuration information is used by the network device to send the data channel.

In an embodiment, the at least one piece of data transmission resource mapping information includes multiple pieces of data transmission resource mapping information, the method further includes: receiving, by the terminal device, a PDCCH sent by the network device, where the PDCCH includes a fourth indication field, and the fourth indication field indicates data transmission resource mapping information used by the network device for transmitting the downlink transmission channel.

That is, the fourth indication field indicates which piece of the multiple pieces of data transmission resource mapping information is used by the network device.

In an embodiment, the downlink transmission channel includes a data channel, the beam corresponding to the downlink transmission channel includes a transmitting beam corresponding to the data channel, and the receiving, by the terminal device, the indication information sent by the network device includes: receiving, by the terminal device, a PDCCH sent by the network device through a beam in a fifth beam group, where a fifth indication field of the PDCCH includes the indication information, the indication information includes a number for a transmitting beam corresponding to the data channel in a sixth beam group, the indication information specifically indicates that the network device sends the data channel by using the transmitting beam corresponding to the number in the sixth beam group, and the fifth beam group is a beam group associated with the sixth beam group;

the determining, by the terminal device, the receiving beam corresponding to the downlink transmission channel according to the indication information includes: determining, by the terminal device, a receiving beam corresponding to the transmitting beam according to the transmitting beam corresponding to the number; and receiving the data channel through the receiving beam corresponding to the transmitting beam.

In an embodiment, the method further includes: receiving, by the terminal device, the multiple pieces of configuration information sent by the network device.

In a third aspect, a network device is provided, and the network device may include a unit for performing the method in the first aspect or any alternative implementation thereof.

In a fourth aspect, a terminal device is provided, and the terminal device includes a unit for performing the method in the second aspect or any alternative implementation thereof In a fifth aspect, a network device is provided, including a memory, a processor, and a transceiver, where the memory is configured to store a program, the processor is configured to execute the program, and when the program is executed, the processor performs the method in the first aspect and any alternative implementation thereof based on the transceiver.

In a sixth aspect, a terminal device is provided, including a memory, a processor, and a transceiver, where the memory is configured to store a program, the processor is configured to execute the program, and when the program is executed, the processor performs the method in the second aspect and any alternative implementation thereof based on the transceiver.

In a seventh aspect, a computer readable medium is provided, where the computer readable medium is configured to store program codes for execution by a terminal device, and the program codes include instructions for performing the method in the first aspect or various implementations thereof.

In an eighth aspect, a computer readable medium is provided, where the computer readable medium is configured to store program codes for execution by a network device, and the program codes include instructions for performing the method in the second aspect or various implementations thereof.

Based on the foregoing technical solution, according to the information transmission method in the embodiments of the present application, a network device may send indication information to a terminal device, where the indication information indicates a beam corresponding to a downlink transmission channel determined by the network device from multiple pieces of configuration information, so that the network device may send the downlink transmission channel over the beam corresponding to the downlink transmission channel. After the terminal device learns that the network device sends the beam corresponding to the downlink transmission channel, the terminal device may select a corresponding receiving beam to receive the downlink transmission channel, thereby improving downlink receiving performance.

BRIEF DESCRIPTION OF THE DRAWINGS

FIG. 1 is a schematic diagram of a communication system according to an embodiment of the present application.

FIG. 2 is a schematic flowchart of an information transmission method according to an embodiment of the present application.

FIG. 3 is a schematic flowchart of an information transmission method according to an embodiment of the present application.

FIG. 4 is a schematic block diagram of a network device according to an embodiment of the present application.

DETAILED DESCRIPTION OF THE EMBODIMENTS

Figure 5:
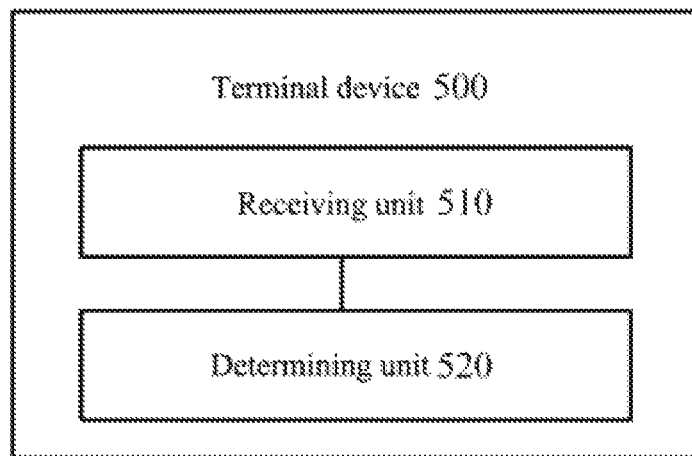
FIG. 5 is a schematic block diagram of a terminal device according to an embodiment of the present application.

The technical solution in the embodiments of the present application will be described below with reference to the accompanying drawings in the embodiments of the present application.

The technical solution in the embodiments of the present application can be applied to various communication systems, for example, a Global System of Mobile communication ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LIE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communication system, or a future 5G system.

FIG. 1 shows a wireless communication system 100 applied in an embodiment of the present application. The wireless communication system 100 may include a network device 110. The network device 110 may be a device that communicates with a terminal device. The network device 110 may provide a particular geographic area with communication coverage and may communicate with terminal devices (e.g., UE) located within the coverage. In an embodiment, the network device 110 may be a base station (Base Transceiver Station, BTS) in the GSM system or the CDMA system, or a base station (NodeB, NB) in the WCDMA system, or an evolved base station (Evolutional Node B, eNB or eNodeB) in the LTE system, or a wireless controller in a Cloud Radio Access Network (CRAN), alternatively, the network device can be a relay station, an access point, a vehicle-mounted device, a wearable device, a network side device in a future 5G network or a network device in a future evolutional Public Land Mobile Network (PLMN).

The wireless communication system 100 also includes at least one terminal device 120 located within the coverage of the network device 110. The terminal device 120 can be mobile or fixed. In an embodiment, the terminal device 120 may refer to an access terminal, User Equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with wireless communication functions, a computing device or other processing devices connected to a wireless modem, a vehicle-mounted device, a wearable device, a terminal device in the future 5G network, or a terminal device in the future evolutional PLMN.

In an embodiment, the 5G system or network may also be referred to as a New Radio (NR) system or network.

FIG. 1 exemplarily shows one network device and two terminal devices. In an embodiment, the wireless communication system 100 may include a plurality of network devices and other numbers of terminal devices may be included within the coverage of each network device, which is not limited in the embodiment of the present application.

In an embodiment, the wireless communication system 100 may further include other network entities, such as a network controller, a mobility management entity, and the like, which is not limited in the embodiment of the present application.

It should be understood that the terms such as "system" and "network" are used interchangeably herein. The term such as "and/or" herein is merely used to describe an association between associated objects, indicating that there may be three relationships, for example, A and/or B may indicate three situations that A exists separately, both A and B exist, B exists separately. In addition, the character "/" herein generally indicates that contextual objects are in an "or" relationship.

FIG. 2 is a schematic flowchart of an information transmission method 200 according to an embodiment of the present application. As shown in FIG. 2, the method 200 includes:

S201, a network device sends indication information to a terminal device, where the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information includes at least one of:

information of at least one transmitting beam, information of a receiving beam corresponding to the at least one transmitting beam, and resource mapping information, where the resource mapping information indicates a resource available or unavailable for downlink transmission of the at least one transmitting beam; and S202, the network device transmits the downlink transmission channel through the beam corresponding to the downlink transmission channel.

Specifically, a network device may send indication information to a terminal device, where the indication information indicates a beam corresponding to a downlink transmission channel determined by the network device from the multiple pieces of configuration information, so that the network device may send the downlink transmission channel over the beam corresponding to the downlink transmission channel. After learning that the network device sends the beam corresponding to the downlink transmission channel, the terminal device may select a corresponding receiving beam to receive the downlink transmission channel. Therefore, it is possible to avoid the problem that there is poor receiving performance resulting from mismatch of the transmitting beam of the network device and the receiving beam of the terminal device.

In an embodiment, each piece of the configuration information corresponds to one beam group, and information of each transmitting beam among the information of the at least one transmitting beam includes at least one of the following:

identification information of each transmitting beam, resource occupying information specific to each transmitting beam, and a number for each transmitting beam in the beam group corresponding to each piece of configuration information.

The resource occupying information specific to each transmitting beam may indicate information of a temporarily occupied time domain resource and/or frequency domain resource of each transmitting beam, for example, a first beam is temporarily used for a certain period to send a measurement signal, therefore, during this period, the first beam cannot be used for transmitting data, so that the terminal device may not receive the data during this period.

In an embodiment, the information of the receiving beam corresponding to the at least one transmitting beam includes identification information of the receiving beam corresponding to the at least one transmitting beam.

In an embodiment, the resource mapping information includes at least one piece of data transmission resource mapping information, each piece of data transmission resource mapping information indicates a resource available or unavailable for downlink transmission of the at least one transmitting beam.

It should be understood that each piece of data transmission resource mapping information may be a piece of data transmission resource mapping information for the entire beam group, at this point, each transmitting beam in the beam group has the same data transmission resource mapping information, or may be a piece of data transmission resource mapping information for each transmitting beam.

In an embodiment, the downlink transmission channel includes a data channel, the beam corresponding to the downlink transmission channel includes a transmitting beam corresponding to the data channel, and the sending, by the network device, the indication information to the terminal device includes:

sending, by the network device, a physical downlink control channel PDCCH to the terminal device through a beam in a first beam group, where a first indication field of the PDCCH includes the indication information, the indication information includes a number for the transmitting beam corresponding to the data channel, the indication information specifically indicates that the network device sends the data channel by using the transmitting beam corresponding to the number in the first beam group, first configuration information of the multiple pieces of configuration information corresponds to the first beam group, the first configuration information is configuration information pre-configured by the network device for the terminal device to receive the data channel.

Specifically, in this embodiment, the network device sends a control channel and a data channel through beams in the same beam group, and the network device may notify the terminal device in advance that the network device uses first configuration information of the multiple pieces of configuration information to send the data channel, where the first configuration information is corresponding to the first beam group, and then the network device may send a Physical Downlink Control Channel (PDCCH for short) through a beam in a first beam group, and notify the terminal device, through a case that a first indication field of the PDCCH includes a number for the transmitting beam corresponding to the data channel, that the network device sends the data channel by using the transmitting beam corresponding to the number in the first beam group, so that the terminal device may determine a corresponding receiving beam according to the transmitting beam and then receives the data channel by using the receiving beam In other words, in this embodiment, the network device may not need to notify the terminal device every time which piece of configuration information is used by the network device, after the network device notifies the terminal device which piece of configuration information is used by the network device, if the network device does not change the configuration information, the terminal device considers that the network device uses the configuration information. Also, by sending the PDCCH, the terminal device may be notified a transmitting beam corresponding to which number from the configuration information is used by the network device to send the data channel.

In an embodiment, the method further includes:

sending, by the network device, a first signaling to the terminal device, where the first signaling includes first configuration indication information, and the first configuration indication information indicates that the network device sends the data channel by using the first configuration information of the multiple pieces of configuration information.

That is, by sending the first signaling to the terminal device and including the first configuration indication information in the first signaling, the network device may indicate which piece of configuration information is used by the network device. For the foregoing embodiment, by sending the first signaling, the network device may notify the terminal device that the network device sends the data channel by using the first configuration information, and before the network device changes the configuration, the terminal device always considers that the network device sends the data channel by using the first configuration information. By sending the PDCCH, the terminal device may be notified a transmitting beam corresponding to which number from the first configuration information is used by the network device to send the data channel.

That is, the network device may semi-statically configure the transmitting beam corresponding to the data channel of the network device, firstly it is pre-configured through high-layer signaling that a transmitting beam in which piece of configuration information is used, and then it is dynamically indicated, through the PDCCH, a transmitting beam corresponding to which number from the configuration information is used.

In an embodiment, the first signaling is Radio Resource Control (RRC for short) signaling or downlink control information (DCI for short).

In general, the network device sends both a control channel and a data channel by using beams in the first beam group, and the network device pre-configures that the first configuration information is used to send the data channel, that is, a transmitting beam in the first beam group is used to send the data channel, the network device may send a PDCCH by using the beam in the first beam group, and dynamically indicate, through indication information in the PDCCH, a transmitting beam of which number in the first beam group is specifically used.

For example, the multiple pieces of configuration information include two pieces of configuration information, as follows:

Beam group 1, including a transmitting beam B1 and a transmitting beam B2, and intra-group numbers are 0 and 1, respectively;

Beam group 2, including a transmitting beam B2, a transmitting beam B3, and a transmitting beam B4, and intra-group numbers are 0, 1, and 2, respectively.

If the network device pre-configures that a beam in the beam group 1 is used to send the data channel, the terminal device receives a PDCCH from B1, and if a first indication field of the PDCCH may include 1 bit, the 1 bit may be indicated as follows:

0, indicating that the transmitting beam used by the data channel is the transmitting beam B1;

1, indicating that the transmitting beam used by the data channel is the transmitting beam B2.

Or, if the network device pre-configures that a beam in the beam group 2 is used to send the data channel, the terminal device receives a PDCCH from B3, and if a first indication field of the PDCCH may include 2 bits, the 2 bits may be indicated as follows:

0, indicating that the transmitting beam used by the data channel is the transmitting beam B2;

1, indicating that the transmitting beam used by the data channel is the transmitting beam B3;

2. indicating that the transmitting beam used by the data channel is the transmitting beam B4.

As another embodiment, the downlink transmission channel includes a data channel, the beam corresponding to the downlink transmission channel includes a receiving beam corresponding to the data channel, and the sending, by the network device, the indication information to the terminal device includes:

sending, by the network device, a PDCCH to the terminal device through a beam in a second beam group, where a second indication field of the PDCCH includes the indication information, the indication information includes identification information of the receiving beam corresponding to the data channel, the indication information specifically indicates that the terminal device receives the data channel by using a receiving beam corresponding to the identification information.

Specifically, the network device may send a PDCCH to the terminal device through a beam in the second beam group, through the case that a second indication field of the PDCCH includes the indication information, the indication information directly indicates that the terminal device receives a receiving beam corresponding to the data channel, such that the terminal device may receive the data channel by using the receiving beam corresponding to the data channel.

For example, the multiple pieces of configuration information include two pieces of configuration information, as follows:

Beam group 1, a receiving beam Beam1, and one piece of data transmission resource mapping information;

Beam group 2, a receiving beam Beam2, and one piece of data transmission resource mapping information.

The terminal device receives a PDCCH sent by the network device, if an indication field of the PDCCH can be indicated as follows:

0, indicating configuration information of the beam group 1;

1, indicating configuration information of the beam group 1,

In this embodiment, each piece of configuration information corresponds to one receiving beam and one piece of data transmission resource mapping information, so the determination of which piece of configuration information to use is equivalent to the determination of which receiving beam and which piece of data transmission resource mapping information to use.

As another embodiment, the downlink transmission channel includes a data channel, the beam corresponding to the downlink transmission channel includes a transmitting beam corresponding to the data channel, and the sending, by the network device, the indication information to the terminal device includes:

sending, by the network device, a PDCCH to the terminal device through a beam in a third beam group, where a third indication field of the PDCCH includes the indication information, the indication information includes a number for a transmitting beam corresponding to the data channel in a fourth beam group, the indication information specifically indicates that the network device sends the data channel by using the transmitting beam corresponding to the number in the fourth beam group, second configuration information of the multiple pieces of configuration information corresponds to the fourth beam group, the second configuration information is configuration information pre-configured by the network device for the terminal device to receive the data channel.

In this embodiment, the network device sends a control channel and a data channel through beams in different beam groups, for example, the network device sends the control channel by using a beam in a third beam group, and sends the data channel by using a beam in a fourth beam group. The network device may notify the terminal device in advance that the network device sends the data channel by using second configuration information of the multiple pieces of configuration information, where the second configuration information corresponds to the fourth beam group, and then the network device may send a PDCCH through the beam in the third beam group, and notify the terminal device, through a case that a third indication field of the PDCCH includes a number for a transmitting beam corresponding to the data channel, that the network device sends the data channel by using the transmitting beam corresponding to the number in the fourth beam group, so that the terminal device may determine a corresponding receiving beam according to the transmitting beam, and then receive the data channel by using the receiving beam.

In an embodiment, the method for the network device to notify the terminal device in advance which piece of configuration information is used by the network device may include:

sending, by the network device, a second signaling to the terminal device, where the second signaling includes second configuration indication information, and the second configuration indication information indicates that the network device sends the data channel by using the second configuration information of the multiple pieces of configuration information.

In an embodiment, the second signaling is a RRC signaling or DCI.

Different from the foregoing embodiments, the network device sends a control channel and a data channel by using beams in different beam groups, and the network device pre-configures that second configuration information is used to send the data channel, that is, a transmitting beam in a fourth beam group is used to send the data channel, the network device may send a PDCCH by using a beam in a third beam group, and dynamically indicate, through indication information in the PDCCH, a transmitting beam of which number in the fourth beam group is specifically used.

For example, the multiple pieces of configuration information include two pieces of configuration information, as follows:

Beam group 1, including a transmitting beam BI and a transmitting beam B2, and intra-group numbers are 0 and 1, respectively;

Beam group 2, including a transmitting beam B2, a transmitting beam B3, and a transmitting beam B4, and intra-group numbers are 0, 1, and 2, respectively.

The network device pre-configures that a beam in the beam group 1 is used to send the data transmission channel, and the terminal device receives a PDCCH from B3. If a third indication field of the PDCCH may include 1 bit, the 1 bit may be indicated as follows:

0, indicating that the transmitting beam used by the data channel is the transmitting beam B1;

1, indicating that the transmitting beam used by the data channel is the transmitting beam B2.

In an embodiment, the method further includes:

sending, by the network device, a PDCCH to the terminal device, where the PDCCH includes third configuration indication information, and the third configuration indication information indicates configuration information used by the network device for sending a data channel.

That is, the third configuration indication information may indicate which piece of the multiple pieces of configuration information is used by the network device for sending the data channel.

That is, the network device may dynamically indicate, though the PDCCH, the network device uses which piece of the multiple pieces of configuration information to send the data channel.

In an embodiment, the at least one data transmission resource mapping information includes multiple pieces of data transmission resource mapping information, the method further includes:

sending, by the network device, a PDCCH to the terminal device, where the PDCCH includes a fourth indication field, and the fourth indication field indicates data transmission resource mapping information used by the network device for transmitting the downlink transmission channel.

That is, the fourth indication field indicates which piece of the multiple pieces of data transmission resource mapping information is used by the network device.

Specifically, each piece of configuration information may further include multiple pieces of data transmission resource mapping information, where each piece of data transmission resource mapping information may indicate a resource available or unavailable for downlink transmission of each transmitting beam, and the network device may notify the terminal device, through a fourth indication field of the PDCCH, which piece of the multiple pieces of data transmission resource mapping information is used by the network device, so that the terminal device receives data according to the indicated data transmission resource mapping information. For example, the data transmission resource mapping information indicates a resource unavailable for downlink transmission, the terminal device may not perform data reception on the resource, and thus it is possible to saving time-frequency resources of the terminal device.

For example, the multiple pieces of configuration information include two pieces of configuration information, as follows:

Beam group 1, a receiving beam Beam1, four pieces of data transmission resource mapping information;

Beam group 2, a receiving beam Beam2, four pieces of data transmission resource mapping information.

The network device pre-configures that configuration information of the beam group 1 is used, and the terminal device receives a PDCCH. If an indication field of the PDCCH may include 1 bit, the 1 bit may be indicated as follows:

0, indicating that the data channel uses the first piece of data transmission resource mapping information;

1, indicating that the data channel uses the second piece of data transmission resource mapping information;

2, indicating that the data channel uses the third piece of data transmission resource mapping information;

3, indicating that the data channel uses the fourth piece of data transmission resource mapping information.

In an embodiment, the downlink transmission channel includes a data channel, the beam corresponding to the downlink transmission channel includes a transmitting beam corresponding to the data channel, and the sending, by the network device, the indication information to the terminal device includes:

sending, by the network device, a PDCCH to the terminal device through a beam in a fifth beam group, where a fifth indication field of the PDCCH includes the indication information, the indication information includes a number for a transmitting beam corresponding to the data channel in a sixth beam group, the indication information specifically indicates that the network device sends the data channel by using the transmitting beam corresponding to the number in the sixth beam group, and the fifth beam group is a beam group associated with the sixth beam group.

Specifically, the fifth beam group and the sixth beam group may be associated beam groups, for example, the network device uses beams in the fifth and sixth beam groups to perform the same service. The network device may send a PDCCH through a beam in the fifth beam group, and indicate, through a case that the indication information is included in the fifth indication field of the PDCCH, a number for a transmitting beam corresponding to the data channel in a sixth beam group, so that the terminal device may determine that the network device sends the data channel by using the transmitting beam corresponding to the number in the sixth beam group, and then the terminal device may determine a receiving beam corresponding to the transmitting beam, and then receive the data channel by using the receiving beam.

In an embodiment, the method further includes:

the network device sends the multiple pieces of configuration information to the terminal device.

The information transmission method according to the embodiment of the present application is described above in detail from the perspective of the network device with reference to FIG. 2, and an information transmission method according to an embodiment of the present application is described below in detail from the perspective of a terminal device with reference to FIG. 3. it should be understood that the description on the terminal device side corresponds to the description on the network device side. For a similar description, reference may be made to the above, and will not be described herein again to avoid repetition.

FIG. 3 is a schematic flowchart of an information transmission method 300 according to an embodiment of the present application. As shown in FIG. 3, the method 300 includes the following:

S301, a terminal device receives indication information sent by a network device, where the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information includes at least one of: information of at least one transmitting beam, information of a receiving beam corresponding to the at least one transmitting beam, and resource mapping information, where the resource mapping information indicates a resource available or unavailable for downlink transmission;

S302, the terminal device determines a receiving beam corresponding to the downlink transmission channel according to the indication information; and S303, the terminal device receives the downlink transmission channel through the receiving beam corresponding to the downlink transmission channel.

Specifically, the terminal device may receive indication information sent by the network device, where the indication information indicates a beam corresponding to a downlink transmission channel determined by the network device from the multiple pieces of configuration information, and in an embodiment, the beam corresponding to the downlink transmission channel is a transmitting beam or a receiving beam, and the terminal device may then determine, according to the indication information, a receiving beam corresponding to the downlink transmission channel, for example, if the beam corresponding to the downlink transmission channel is a transmitting beam corresponding to the downlink transmission channel, the terminal device may determine a receiving beam corresponding to the transmitting beam, and then the receiving beam is used to receive the downlink transmission channel. Alternatively, if the beam corresponding to the downlink transmission channel is a receiving beam corresponding to the downlink transmission channel, the terminal device may directly receive the downlink transmission channel by using the receiving beam corresponding to the downlink transmission channel.

In an embodiment, each piece of configuration information corresponds to one beam group, and information of each transmitting beam among the information of the at least one transmitting beam includes at least one of the following:

identification information of each transmitting beam, resource occupying information specific to each transmitting beam, and a number for each transmitting beam in the beam group corresponding to each piece of configuration information.

In an embodiment, the information of the receiving beam corresponding to the at least one transmitting beam includes identification information of the receiving beam corresponding to the at least one transmitting beam.

In an embodiment, the resource mapping information includes at least one piece of data transmission resource mapping information, where each piece of data transmission resource mapping information indicates a resource available or unavailable for downlink transmission of the at least one transmitting beam.

In an embodiment, the downlink transmission channel includes a data channel, the beam corresponding to the downlink transmission channel includes a transmitting beam corresponding to the data channel, and the receiving, by the terminal device, the indication information sent by the network device includes:

receiving, by the terminal device, a physical downlink control channel PDCCH sent by the network device through a beam in a first beam group, where a first indication field of the PDCCH includes the indication information, the indication information includes a number for the transmitting beam corresponding to the data channel, the indication information specifically indicates that the network device sends the data channel by using the transmitting beam corresponding to the number in the first beam group, first configuration information of the multiple pieces of configuration information corresponds to the first beam group, the first configuration information is configuration information pre-configured by the network device for the terminal device to receive the data channel;

the determining, by the terminal device, the receiving beam corresponding to the downlink transmission channel according to the indication information includes:

determining, by the terminal device, a receiving beam corresponding to the transmitting beam according to the transmitting beam corresponding to the number; and receiving the data channel through the receiving beam corresponding to the transmitting beam.

Specifically, in this embodiment, the network device sends a control channel and a data channel by using beams in the same beam group, and the terminal device defaults that the network device sends the data channel using first configuration information of the multiple pieces of configuration information, where the first configuration information corresponds to the first beam group. The indication information includes a number for a transmitting beam corresponding to the data channel, the terminal device receives a PDCCH that is sent by the network device using a beam in the first beam group, and the terminal device is notified, through a case that a first indication field of the PDCCH includes the indication information, that the network device sends the data channel using the transmitting beam corresponding to the number in the first beam group, so that the terminal device may determine a corresponding receiving beam according to the transmitting beam, and then receive the data channel using the receiving beam.

In an embodiment, the method further includes:

receiving, by the terminal device, a first signaling sent by the network device, where the first signaling includes first configuration indication information, and the first configuration indication information indicates that the network device sends the data channel by using the first configuration information of the multiple pieces of configuration information.

That is, the network device may notify the terminal device, through the first signaling, which piece of the multiple pieces of configuration information is used by the network device. In an embodiment, the first signaling is a radio resource control RRC signaling or downlink control information DCI.

That is, the network device may semi-statically configure the transmitting beam corresponding to the data channel of the network device, firstly it is pre-configured through high-layer signaling that a transmitting beam in which piece of configuration information is used, and then it is dynamically indicated, through the PDCCH, a transmitting beam corresponding to which number from the configuration information is used.

In an embodiment, the downlink transmission channel includes a data channel, the beam corresponding to the downlink transmission channel includes a receiving beam corresponding to the data channel, and the receiving, by the terminal device, the indication information sent by the network device includes:

receiving, by the terminal device, a PDCCH sent by the network device through a beam in a second beam group, where a second indication field of the PDCCH includes the indication information, the indication information includes identification information of the receiving beam corresponding to the data channel, the indication information specifically indicates that the terminal device receives the data channel by using a receiving beam corresponding to the identification information.

In this embodiment, the terminal device may receive a PDCCH that is sent by the network device using a beam in a second beam group, and through a case that a second indication field of the PDCCH includes the indication information, the indication information indicates that the terminal device receives a receiving beam corresponding to the data channel, so that the terminal device can directly receive the data channel by using the receiving beam corresponding to the data channel.

In an embodiment, the downlink transmission channel includes a data channel, the beam corresponding to the downlink transmission channel includes a transmitting beam corresponding to the data channel, and the receiving, by the terminal device, the indication information sent by the network device includes:

receiving, by the terminal device, a PDCCH sent by the network device through a beam in a third beam group, where a third indication field of the PDCCH includes the indication information, the indication information includes a number for a transmitting beam corresponding to the data channel in a fourth beam group, the indication information specifically indicates that the network device sends the data channel by using the transmitting beam corresponding to the number in the fourth beam group, second configuration information of the multiple pieces of configuration information corresponds to the fourth beam group, the second configuration information is configuration information pre-configured by the network device for the terminal device to receive the data channel;

the determining, by the terminal device, the receiving beam corresponding to the downlink transmission channel according to the indication information includes:

determining, by the terminal device, a receiving beam corresponding to the transmitting beam according to the transmitting beam corresponding to the number; and receiving the data channel through the receiving beam corresponding to the transmitting beam.

In this embodiment, the network device notifies the terminal device in advance that the network device sends a PDCCH through a beam in a third beam group, and sends a data channel through a beam in a fourth beam group, that is, the network device sends the data channel and the control channel by using beams in different beam groups, so that the terminal device receives the PDCCH sent by the network device through the beam in the third beam group, and then determines, according to the indication information included in the third indication field in the PDCCH, the network device uses which beam in the fourth group to send the data channel.

In an embodiment, the method further includes:

receiving, by the terminal device, a second signaling sent by the network device, where the second signaling includes second configuration indication information, and the second configuration indication information indicates that the network device sends the data channel by using the second configuration information of the multiple pieces of configuration information.

That is to say, by sending second signaling, the network device may notify the terminal device in advance which group of configuration information is used by the network device to send the data channel. In an embodiment, the second signaling is a RRC signaling or DCI.

In an embodiment, the method further includes:

receiving, by the terminal device, a PDCCH sent by the network device, where the PDCCH includes third configuration indication information, and the third configuration indication information indicates configuration information used by the network device for sending a data channel.

That is, the third configuration indication information indicates which piece of the multiple pieces of configuration information is used by the network device to send the data channel.

That is to say, the network device may dynamically indicate, through the third configuration indication information in the PDCCH, which piece of the multiple pieces of configuration information is used by the network device to send the data channel.

In an embodiment, the at least one piece of data transmission resource mapping information includes multiple pieces of data transmission resource mapping information, the method further includes:

receiving, b the terminal device, a PDCCH sent by the network device, where the PDCCH includes a fourth indication field, and the fourth indication field indicates data transmission resource mapping information used by the network device for transmitting the downlink transmission channel.

That is, the fourth indication field indicates which piece of the multiple pieces of data transmission resource mapping information is used by the network device.

In an embodiment, the downlink transmission channel includes a data channel, the beam corresponding to the downlink transmission channel includes a transmitting beam corresponding to the data channel, and the receiving, by the terminal device, the indication information sent by the network device includes:

receiving, by the terminal device, a PDCCH sent by the network device through a beam in a fifth beam group, where a fifth indication field of the PDCCH includes the indication information, the indication information includes a number for a transmitting beam corresponding to the data channel in a sixth beam group, the indication information specifically indicates that the network device sends the data. channel by using the transmitting beam corresponding to the number in the sixth beam group, and the fifth beam group is a beam group associated with the sixth beam group;

the determining, by the terminal device, the receiving beam corresponding to the downlink transmission channel according to the indication information includes:

determining, by the terminal device, a receiving beam corresponding to the transmitting beam according to the transmitting beam corresponding to the number; and receiving the data channel through the receiving beam corresponding to the transmitting beam.

In an embodiment, the method further includes:

receiving, by the terminal device, the multiple pieces of configuration information sent by the network device.

The method embodiments of the present application are described in detail above with reference to FIG. 2 and FIG. 3, and device embodiments of the present application will be described in detail below with reference to FIG. 4 to FIG. 7. It should be understood that the device embodiments correspond to the method embodiments, for a similar description, reference may be made to the method embodiments.

FIG. 4 is a schematic block diagram of a network device according to an embodiment of the present disclosure. The network device 400 of FIG. 4 includes a transceiving unit 410.

The transceiving unit 410 is configured to: send indication information to a terminal device, where the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information includes at least one of: information of at least one transmitting beam, information of a receiving beam corresponding to the at least one transmitting beam, and resource mapping information, where the resource mapping information indicates a resource available or unavailable for downlink transmission of the at least one transmitting beam; and transmit the downlink transmission channel through the beam corresponding to the downlink transmission channel.

In an embodiment, each piece of configuration information corresponds to one beam group, and information of each transmitting beam among the information of the at least one transmitting beam includes at least one of the following:

identification information of each transmitting beam, resource occupying information specific to each transmitting beam, and a number for each transmitting beam in the beam group corresponding to each piece of configuration information.

In an embodiment, the information of the receiving beam corresponding to the at least one transmitting beam includes identification information of the receiving beam corresponding to the at least one transmitting beam.

In an embodiment, the resource mapping information includes at least one piece of data transmission resource mapping information, each piece of data transmission resource mapping information indicates a resource available or unavailable for downlink transmission of the at least one transmitting beam.

In an embodiment, the downlink transmission channel includes a data channel, the beam corresponding to the downlink transmission channel includes a transmitting beam corresponding to the data channel, and the transceiving unit 410 is further configured to:

send a physical downlink control channel PDCCH to the terminal device through a beam in a first beam group, where a first indication field of the PDCCH includes the indication information, the indication information includes a number for the transmitting beam corresponding to the data channel, the indication information specifically indicates that the network device sends the data channel by using the transmitting beam corresponding to the number in the first beam group, first configuration information of the multiple pieces of configuration information corresponds to the first beam group, the first configuration information is configuration information pre-configured by the network device for the terminal device to receive the data channel.

In an embodiment, the transceiving unit 410 is further configured to:

send a first signaling to the terminal device, where the first signaling includes first configuration indication information, and the first configuration indication information indicates that the network device sends the data channel by using the first configuration information of the multiple pieces of configuration information.

In an embodiment, the downlink transmission channel includes a data channel, the beam corresponding to the downlink transmission channel includes a receiving beam corresponding to the data channel, and the transceiving unit 410 is further configured to:

send a PDCCH to the terminal device through a beam in a second beam group, where a second indication field of the PDCCH includes the indication information, the indication information includes identification information of the receiving beam corresponding to the data channel, the indication information specifically indicates that the terminal device receives the data channel by using a receiving beam corresponding to the identification information.

In an embodiment, the downlink transmission channel includes a data channel, the beam corresponding to the downlink transmission channel includes a transmitting beam corresponding to the data channel, and the transceiving unit 410 is further configured to:

send a PDCCH to the terminal device through a beam in a third beam group, where a third indication field of the PDCCH includes the indication information, the indication information includes a number for a transmitting beam corresponding to the data channel in a fourth beam group, the indication information specifically indicates that the network device sends the data channel by using the transmitting beam corresponding to the number in the fourth beam group, second configuration information of the multiple pieces of configuration information corresponds to the fourth beam group, the second configuration information is configuration information pre-configured by the network device for the terminal device to receive the data channel.

In an embodiment, the transceiving unit 410 is further configured to:

send a second signaling to the terminal device, where the second signaling includes second configuration indication information, and the second configuration indication information indicates that the network device sends the data channel by using the second configuration information of the multiple pieces of configuration information.

In an embodiment, the second signaling is a RRC signaling or DCI.

In an embodiment, the transceiving unit 410 is further configured to:

send a PDCCH to the terminal device, where the PDCCH includes third configuration indication information, and the third configuration indication information indicates configuration information used by the network device for sending a data channel.

That is, the third configuration indication information indicates which piece of the multiple pieces of configuration information is used by the network device to send the data channel.

In an embodiment, the at least one piece of data transmission resource mapping information includes multiple pieces of data transmission resource mapping information, and the transceiving unit 410 is further configured to:

send a PDCCH to the terminal device, where the PDCCH includes a fourth indication field, and the fourth indication field indicates data transmission resource mapping information used by the network device for transmitting the downlink transmission channel.

That is, the fourth indication field indicates which piece of the multiple pieces of data transmission resource mapping information is used by the network device.

In an embodiment, the downlink transmission channel includes a data channel, the beam corresponding to the downlink transmission channel includes a transmitting beam corresponding to the data channel, and the transceiving unit 410 is further configured to:

send a PDCCH to the terminal device through a beam in a fifth beam group, where a fifth indication field of the PDCCH includes the indication information, the indication information includes a number for a transmitting beam corresponding to the data channel in a sixth beam group, the indication information specifically indicates that the network device sends the data channel by using the transmitting beam corresponding to the number in the sixth beam group, and the fifth beam group is a beam group associated with the sixth beam group.

In an embodiment, the transceiving unit 410 is further configured to:

send the multiple pieces of configuration information to the terminal device.

It should be understood that the network device 400 may correspond to the network device in the method 200, and corresponding functions of the network device may be implemented and are not described herein again for brevity.

FIG. 5 is a schematic block diagram of a terminal device according to an embodiment of the present application. The terminal device 500 of FIG. 5 includes:

a receiving unit 510, configured to receive indication information sent by a network device, where the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information includes at least one of: information of at least one transmitting beam, information of a receiving beam corresponding to the at least one transmitting beam, and resource mapping information, where the resource mapping information indicates the resource available or unavailable for downlink transmission; and a determining unit 520, configured to determine a receiving beam corresponding to the downlink transmission channel according to the indication information;

the receiving unit 510 is further configured to: receive the downlink transmission channel through the receiving beam corresponding to the downlink transmission channel.

In an embodiment, each piece of configuration information corresponds to one beam group, and information of each transmitting beam among the information of the at least one transmitting beam includes at least one of the following:

identification information of each transmitting beam, resource occupying information specific to each transmitting beam, and a number for each transmitting beam in the beam group to which each transmitting beam belongs.

In an embodiment, the information of the receiving beam corresponding to the at least one transmitting beam includes identification information of the receiving beam corresponding to the at least one transmitting beam.

In an embodiment, the resource mapping information includes at least one piece of data transmission resource mapping information, each piece of data transmission resource mapping information indicates a resource available or unavailable for downlink transmission of the at least one transmitting beam.

In an embodiment, the downlink transmission channel includes a data channel, the beam corresponding to the downlink transmission channel includes a transmitting beam corresponding to the data channel, and the receiving unit 510 is further configured to:

receive a physical downlink control channel PDCCH sent by the network device through a beam in a first beam group, where a first indication field of the PDCCH includes the indication information, the indication information includes a number for the transmitting beam corresponding to the data channel, the indication. information specifically indicates that the network device sends the data channel by using the transmitting beam corresponding to the number in the first beam group, first configuration information of the multiple pieces of configuration information corresponds to the first beam group, the first configuration information is configuration information pre-configured by the network device for the terminal device to receive the data channel;

the determining unit 520 is specifically configured to:

determine a receiving beam corresponding to the transmitting beam according to the transmitting beam corresponding to the number;

the receiving unit 510 is specifically configured to:

receive the data channel through the receiving beam corresponding to the transmitting beam.

In an embodiment, the receiving unit 510 is further configured to:

receive a first signaling sent by the network device, where the first signaling includes first configuration indication information, and the first configuration indication information indicates that the network device sends the data channel by using the first configuration information of the multiple pieces of configuration information.

In an embodiment, the downlink transmission channel includes a data channel, the beam corresponding to the downlink transmission channel includes a receiving beam corresponding to the data channel, and the receiving unit 510 is further configured to:

receive a PDCCH sent by the network device through a beam in a second beam group, where a second indication field of the PDCCH includes the indication information, the indication information includes identification information of the receiving beam corresponding to the data channel, the indication information specifically indicates that the terminal device receives the data channel by using a receiving beam corresponding to the identification information.

In an embodiment, the downlink transmission channel includes a data channel, the beam corresponding to the downlink transmission channel includes a transmitting beam corresponding to the data channel, and the receiving unit 510 is further configured to:

receive a PDCCH sent by the network device through a beam in a third beam group, where a third indication field of the PDCCH includes the indication information, the indication information includes a number for a transmitting beam corresponding to the data channel in a fourth beam group, the indication information specifically indicates that the network device sends the data channel by using the transmitting beam corresponding to the number in the fourth beam group, second configuration information of the multiple pieces of configuration information corresponds to the fourth beam group, the second configuration information is configuration information pre-configured by the network device for the terminal device to receive the data channel.

In an embodiment, the receiving unit 510 is further configured to:

receive a second signaling sent by the network device, where the second signaling includes second configuration indication information, and the second configuration indication information indicates that the network device sends the data channel by using the second configuration information of the multiple pieces of configuration information.

In an embodiment, the second signaling is a RRC signaling or DCI.

In an embodiment, the transceiving unit is further configured to:

receive a PDCCH sent by the network device, where the PDCCH includes third configuration indication information, and the third configuration indication information indicates configuration information used by the network device for sending a data channel.

That is, the third configuration indication information indicates which piece of the multiple pieces of configuration information is used by the network device to send the data channel.

In an embodiment, the at least one piece of data transmission resource mapping information includes multiple pieces of data transmission resource mapping information, and the receiving unit 510 is further configured to:

receive a PDCCH sent by the network device, where the PDCCH includes a fourth indication field, and the fourth indication field indicates data transmission resource mapping information used by the network device for transmitting downlink transmission channel.

That is, the fourth indication field indicates which piece of the multiple pieces of data transmission resource mapping information is used by the network device to transmit the downlink transmission channel.

In an embodiment, the downlink transmission channel includes a data channel, the beam corresponding to the downlink transmission channel includes a transmitting beam corresponding to the data channel, and the receiving unit 510 is further configured to:

receive a PDCCH sent by the network device through a beam in a fifth beam group, where a fifth indication field of the PDCCH includes the indication information, the indication information includes a number for a transmitting beam corresponding to the data channel in a sixth beam group, the indication information specifically indicates that the network device sends the data channel by using the transmitting beam corresponding to the number in the sixth beam group, and the fifth beam group is a beam group associated with the sixth beam group.

In an embodiment, the receiving unit 510 is further configured to:

receive the multiple pieces of configuration information sent by the network device.

It should be understood that the terminal device 500 may correspond to the terminal device in the method 300, and corresponding functions of the terminal device may be implemented and are not described herein again for brevity.

Figure 6:
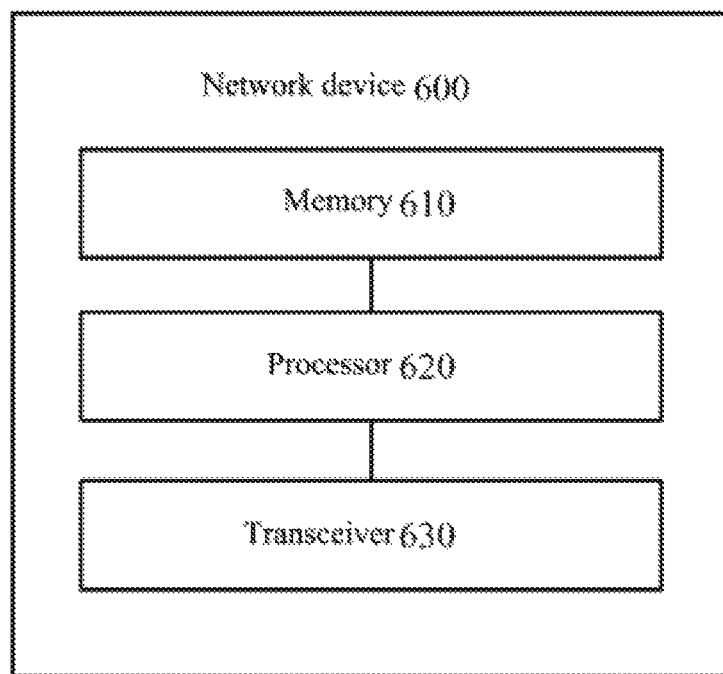
FIG. 6 is a schematic block diagram of a network device according to an embodiment of the present application.

FIG. 6 is a schematic block diagram of a network device according to an embodiment of the present disclosure. The network device 600 of FIG. 6 includes a memory 610, a processor 620 and a transceiver 630, where the memory is configured to store a program, the processor 620 is configured to execute the program, when the program is executed, the processor 620 is configured to control the transceiver 630 to send indication information to the terminal device, where the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information includes at least one of: information of at least one transmitting beam, information of a receiving beam corresponding to the at least one transmitting beam, and resource mapping information, where the resource mapping information indicating resources available or unavailable for downlink transmission of the at least one transmitting beam; and transmit the downlink transmission channel through the beam corresponding to the downlink transmission channel.

In an embodiment, each piece of configuration information corresponds to one beam group, and information of each transmitting beam among the information of the at least one transmitting beam includes at least one of the following:

identification information of each transmitting beam, resource occupying information specific to each transmitting beam, and a number for each transmitting beam in the beam group corresponding to each piece of configuration information.

In an embodiment, the information of the receiving beam corresponding to the at least one transmitting beam includes identification information of the receiving beam corresponding to the at least one transmitting beam.

In an embodiment, the resource mapping information includes at least one piece of data transmission resource mapping information, each piece of data transmission resource mapping information indicates a resource available or unavailable for downlink transmission of the at least one transmitting beam.

In an embodiment, the downlink transmission channel includes a data channel, the beam corresponding to the downlink transmission channel includes a transmitting beam corresponding to the data channel, and the transceiver 630 is further configured to:

send a physical downlink control channel PDCCH to the terminal device through a beam in a first beam group, where a first indication field of the PDCCH includes the indication information, the indication information includes a number for the transmitting beam corresponding to the data channel, the indication information specifically indicates that the network device sends the data channel by using the transmitting beam corresponding to the number in the first beam group, first configuration information of the multiple pieces of configuration information corresponds to the first beam group, the first configuration information is configuration information pre-configured by the network device for the terminal device to receive the data channel.

In an embodiment, the transceiver 630 is further configured to:

send a first signaling to the terminal device, where the first signaling includes first configuration indication information, and the first configuration indication information indicates that the network device sends the data channel by using the first configuration information of the multiple pieces of configuration information.

In an embodiment, the downlink transmission channel includes a data channel, the beam corresponding to the downlink transmission channel includes a receiving beam corresponding to the data channel, and the transceiver 630 is further configured to:

send a PDCCH to the terminal device through a beam in a second beam group, where a second indication field of the PDCCH includes the indication information, the indication information includes identification information of the receiving beam corresponding to the data channel, the indication information specifically indicates that the terminal device receives the data channel by using a receiving beam corresponding to the identification information.

In an embodiment, the downlink transmission channel includes a data channel, the beam corresponding to the downlink transmission channel includes a transmitting beam corresponding to the data channel, and the transceiver 630 is further configured to:

send a PDCCH to the terminal device through a beam in a third beam group, where a third indication field of the PDCCH includes the indication information, the indication information includes a number for a transmitting beam corresponding to the data channel in a fourth beam group, the indication information specifically indicates that the network device sends the data channel by using the transmitting beam corresponding to the number in the fourth beam group, second configuration information of the multiple pieces of configuration information corresponds to the fourth beam group, the second configuration information is configuration information pre-configured by the network device for the terminal device to receive the data channel.

In an embodiment, the transceiver 630 is further configured to:

send a second signaling to the terminal device, where the second signaling includes second configuration indication information, and the second configuration indication information indicates that the network device sends the data channel by using the second configuration information of the multiple pieces of configuration information.

In an embodiment, the second signaling is a RRC signaling or DCI.

in an embodiment, the transceiver 630 is further configured to:

send a PDCCH to the terminal device, where the PDCCH includes third configuration indication information, and the third configuration indication information indicates configuration information used by the network device for sending a data channel.

That is, the third configuration indication information indicates which piece of the multiple pieces of configuration information is used by the network device to send the data channel.

in an embodiment, the at least one piece of data transmission resource mapping information includes multiple pieces of data transmission resource mapping information, and the transceiver 630 is further configured to:

send a PDCCH to the terminal device, where the PDCCH includes a fourth indication field, and the fourth indication field indicates data transmission resource mapping information used by the network device for transmitting the downlink transmission channel.

That is, the fourth indication field indicates which piece of the multiple pieces of data transmission resource mapping information is used by the network device.

In an embodiment, the downlink transmission channel includes a data channel, the beam corresponding to the downlink transmission channel includes a transmitting beam corresponding to the data channel, and the transceiver 630 is further configured to:

send a PDCCH to the terminal device through a beam in a fifth beam group, where a fifth indication field of the PDCCH includes the indication information, the indication information includes a number for a transmitting beam corresponding to the data channel in a sixth beam group, the indication information specifically indicates that the network device sends the data channel by using the transmitting beam corresponding to the number in the sixth beam group, and the fifth beam group is a beam group associated with the sixth beam group.

In an embodiment, the transceiver 630 is further configured to:

send the multiple pieces of configuration information to the terminal device.

It should be understood that the network device 600 may correspond to the network device in the method 200, and corresponding functions of the network device may be implemented and are not described herein again for brevity.

Figure 7:
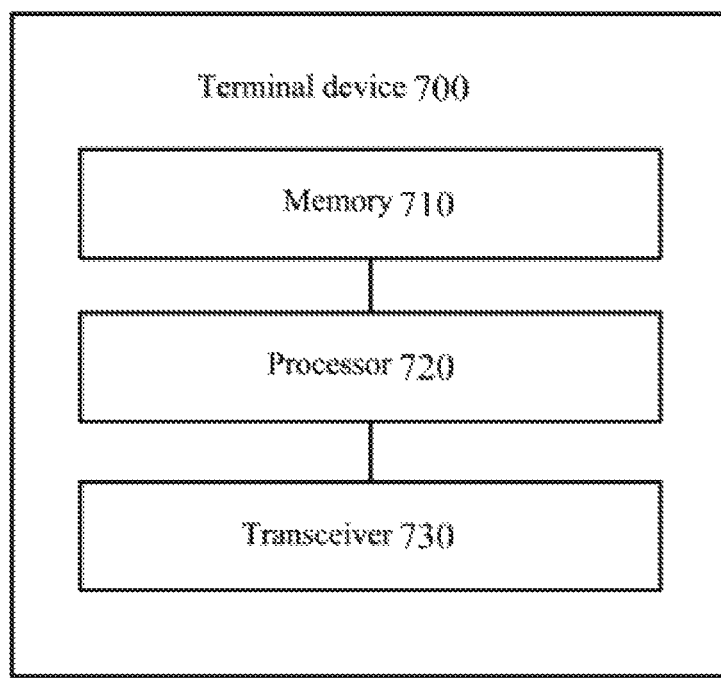
FIG. 7 is a schematic block diagram of a terminal device according to an embodiment of the present application.

FIG. 7 is a schematic block diagram of a terminal device according to an embodiment of the present application. The terminal device 700 of FIG. 7 includes a memory 710, a processor 720 and a transceiver 730, where the memory 710 is configured to store a program, the processor 720 is configured to execute the program, when the program is executed, the processor 720 is configured to control the transceiver 730 to receive indication information sent by the network device, where the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information includes at least one of: information of at least one transmitting beam, information of a receiving beam corresponding to the at least one transmitting beam, and resource mapping information, where the resource mapping information indicates a resource available or unavailable for downlink transmission;

the processor 720 is further configured to determine a receiving beam corresponding to the downlink transmission channel according to the indication information;

the transceiver 730 is further configured to: receive the downlink transmission channel through the receiving beam corresponding to the downlink transmission channel.

In an embodiment, each piece of configuration information corresponds to one beam group, and information of each transmitting beam among the information of the at least one transmitting beam includes at least one of the following:

identification information of each transmitting beam, resource occupying information specific to each transmitting beam, and a number for each transmitting beam in the beam group to which each transmitting beam belongs.

In an embodiment, the information of the receiving beam corresponding to the at least one transmitting beam includes identification information of the receiving beam corresponding to the at least one transmitting beam.

In an embodiment, the resource mapping information includes at least one piece of data transmission resource mapping information, each piece of data transmission resource mapping information indicates a resource available or unavailable for downlink transmission of the at least one transmitting beam.

In an embodiment, the downlink transmission channel includes a data channel, the beam corresponding to the downlink transmission channel includes a transmitting beam corresponding to the data channel, and the transceiver 730 is further configured to:

receive a physical downlink control channel PDCCH sent by the network device through a beam in a first beam group, where a first indication field of the PDCCH includes the indication information, the indication information includes a number for the transmitting beam corresponding to the data channel, the indication. information specifically indicates that the network device sends the data channel by using the transmitting beam corresponding to the number in the first beam group, first configuration information of the multiple pieces of configuration information corresponds to the first beam group, the first configuration information is configuration information pre-configured by the network device for the terminal device to receive the data channel;

the processor 720 is specifically configured to:

determine a receiving beam corresponding to the transmitting beam according to the transmitting beam corresponding to the number;

the transceiver 730 is specifically configured to:

receive the data channel through the receiving beam corresponding to the transmitting beam.

In an embodiment, the transceiver 730 is further configured to:

receive a first signaling sent by the network device, where the first signaling includes first configuration indication information, and the first configuration indication information indicates that the network device sends the data channel by using the first configuration information of the multiple pieces of configuration information.

In an embodiment, the downlink transmission channel includes a data channel, the beam corresponding to the downlink transmission channel includes a receiving beam corresponding to the data channel, and the transceiver 730 is further configured to:

receive a PDCCH sent by the network device through a beam in a second beam group, where a second indication field of the PDCCH includes the indication information, the indication information includes identification information of the receiving beam corresponding to the data channel, the indication information specifically indicates that the terminal device receives the data channel by using a receiving beam corresponding to the identification information.

In an embodiment, the downlink transmission channel includes a data channel, the beam corresponding to the downlink transmission channel includes a transmitting beam corresponding to the data channel, and the transceiver 730 is further configured to:

receive a PDCCH sent by the network device through a beam in a third beam group, where a third indication field of the PDCCH includes the indication information, the indication information includes a number for a transmitting beam corresponding to the data channel in a fourth beam group, the indication information specifically indicates that the network device sends the data by using the transmitting beam corresponding to the number in the fourth beam group, second configuration information of the multiple pieces of configuration information corresponds to the fourth beam group, the second configuration information is configuration information pre-configured by the network device for the terminal device to receive the data channel.

In an embodiment, the transceiver 730 is further configured to:

receive a second signaling sent by the network device, where the second signaling includes second configuration indication information, and the second configuration indication information indicates that the network device sends the data channel by using the second configuration information of the multiple pieces of configuration information.

In an embodiment, the second signaling is a RRC signaling or DCI.

In an embodiment, the transceiver 730 is further configured to:

receive a PDCCH sent by the network device, where the PDCCH includes third configuration indication information, and the third configuration indication information indicates configuration information used by the network device for sending a data channel.

That is, the third configuration indication information indicates which piece of the multiple pieces of configuration information is used by the network device to send the data channel.

In an embodiment, the at least one piece of data transmission resource mapping information includes multiple pieces of data transmission resource mapping information, and the transceiver 730 is further configured to:

receive a PDCCH sent by the network device, where the PDCCH includes a fourth indication field, and the fourth indication field indicates data transmission resource mapping information used by the network device for transmitting downlink transmission channel.

That is, the fourth indication field indicates which piece of the multiple pieces of data transmission resource mapping information is used by the network device to transmit the downlink transmission channel.

In an embodiment, the downlink transmission channel includes a data channel, the beam corresponding to the downlink transmission channel includes a transmitting beam corresponding to the data channel, and the transceiver 730 is further configured to:

receive a PDCCH sent by the network device through a beam in a fifth beam group, where a fifth indication field of the PDCCH includes the indication information, the indication information includes a number for a transmitting beam corresponding to the data channel in a sixth beam group, the indication information specifically indicates that the network device sends the data channel by using the transmitting beam corresponding to the number in the sixth beam group, and the fifth beam group is a beam group associated with the sixth beam group.

In an embodiment, the transceiver 730 is further configured to:

receive the multiple pieces of configuration information sent by the network device, It should be understood that the terminal device 700 may correspond to the terminal device in the method 300, and corresponding functions of the terminal device may be implemented and are not described herein again for brevity.

It should be understood that the terms such as "and/or" herein is merely used to describe an association between associated objects, indicating that there may be three relationships, for example, A and/or B may indicate three situations that A exists separately, both A and B exist, B exists separately. In addition, the character "/" herein generally indicates that contextual objects are in an "or" relationship.

It should be understood that, in the various embodiments of the present application, the size of the sequence numbers of the foregoing processes does not mean the order of execution sequence, and the order of execution of each process should be determined by its function and internal logic, and is not intended to limit the implementing process of the embodiments of the present application in any way.

Those skilled in the art may realize that the unit and algorithm processes of each example described in the embodiments disclosed herein may be implemented by electronic hardware or a combination of computer software and the electronic hardware. Whether to realize these functions by hardware or software depends to specific application and design constraints of the technical solutions. Those skilled in the art may realize the described functions for each specific application by different methods, but such realization shall not be conceived as going beyond the scope of the present application.

Those skilled in the art may clearly know that, for specific working processes of the systems, devices and units described above, reference may be made to the corresponding processes in the method embodiments and details will not be described herein again for the sake of convenient and brief description.

In several embodiments provided in the present application, it will be appreciated that the disclosed systems, devices and methods may be implemented in another manner. For example, the device embodiments described above are only illustrative. For example, division of the units is only division of logic functions, and there may be other division manners during a practical implementation. For example, multiple units or components may be combined or integrated into another system, or some characteristics may be omitted or not executed. In addition, mutual couplings or direct couplings or communication connections shown or discussed may be implemented through some interfaces. The direct couplings or communication connections between the devices or units may be implemented in electrical, mechanical or in other forms.

The units described as separate parts may or may not be physically separated. The parts displayed as units may or may not be physical units, namely, the parts may be located in the same place, or may be distributed to multiple network units. Part or all of the units may be selected, according to a practical requirement, to achieve the objectives of the schemes in the embodiments.

In addition, each function unit in each embodiment of the present application may be integrated into a processing unit, each unit may also physically exist independently, and two or more units may also be integrated into a unit.

When implemented in form of software function unit and sold or used as an independent product, the functions may be stored in a computer-readable storage medium. Based on such understanding, the technical solutions of the present application substantially or the part making contributions to the prior art or part of the technical solutions may be embodied by a software product, and the computer software product is stored in a storage medium, including a plurality of instructions for enabling computer equipment (which may be a personal computer, a server, network equipment or the like) to execute all or part of steps of the method in each embodiment of the present application. The abovementioned storage medium includes various media capable of storing program codes such as a USB flash disk, a mobile hard disk, a Read-Only Memory (ROM), a Random Access Memory (RAM), a magnetic disk or an optical disk.

The above is only specific implementations of the present application but not intended to limit the scope of protection of the present application. Any variations or replacements apparent to those skilled in the art within the technical scope disclosed in the present application shall fall into the scope of protection of the present application. Therefore, the scope of protection of the present application shall be subject to the scope of protection of the claims.

What is claimed is:

1. An information transmission method, comprising:

receiving, by a terminal device, indication information sent by a network device, wherein the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information comprises at least one of: information of at least one transmitting beam, information of a receiving beam corresponding to the at least one transmitting beam, and resource mapping information, wherein the resource mapping information indicates a resource available or unavailable for downlink transmission;

determining, by the terminal device, a receiving beam corresponding to the downlink transmission channel according to the indication information; and receiving, by the terminal device, the downlink transmission channel through the receiving beam corresponding to the downlink transmission channel, wherein the downlink transmission channel comprises a data channel, the beam corresponding to the downlink transmission channel comprises a transmitting beam corresponding to the data channel, and the receiving, by the terminal device, the indication information sent by the network device comprises:

receiving, by the terminal device, a physical downlink control channel (PDCCH) sent by the network device through a beam in a third beam group, wherein a third indication field of the PDCCH comprises the indication information, the indication information comprises a number for the transmitting beam corresponding to the data channel in a fourth beam group, the indication information specifically indicates that the network device sends the data channel by using the transmitting beam corresponding to the number in the fourth beam group, second configuration information of the multiple pieces of configuration information corresponds to the fourth beam group, the second configuration information is configuration information pre-configured by the network device for the terminal device to receive the data channel;

the determining, by the terminal device, the receiving beam corresponding to the downlink transmission channel according to the indication information comprises:

determining, by the terminal device, a receiving beam corresponding to the transmitting beam according to the transmitting beam corresponding to the number; and receiving the data channel through the receiving beam corresponding to the transmitting beam.

2. The method according to claim 1, wherein each piece of configuration information corresponds to one beam group, and information of each transmitting beam among the information of the at least one transmitting beam comprises at least one of the following:

identification information of each transmitting beam, resource occupying information specific to each transmitting beam, and a number for each transmitting beam in the beam group corresponding to each piece of configuration information.

3. The method according to claim 1, wherein the information of the receiving beam corresponding to the at least one transmitting beam comprises identification information of the receiving beam corresponding to the at least one transmitting beam.

4. The method according to claim 1, wherein the resource mapping information comprises at least one piece of data transmission resource mapping information, each piece of data transmission resource mapping information indicates a resource available or unavailable for downlink transmission of the at least one transmitting beam.

5. The method according to claim 2, wherein the receiving, by the terminal device, the indication information sent by the network device comprises:
receiving, by the terminal device, a PDCCH sent by the network device through a beam in a first beam group, wherein a first indication field of the PDCCH comprises the indication information, the indication information comprises a number for the transmitting beam corresponding to the data channel, the indication information specifically indicates that the network device sends the data channel by using the transmitting beam corresponding to the number in the first beam group, first configuration information of the multiple pieces of configuration information corresponds to the first beam group, the first configuration information is configuration information pre-configured by the network device for the terminal device to receive the data channel.

6. The method according to claim 5, further comprising:
receiving, by the terminal device, a first signaling sent by the network device, wherein the first signaling comprises first configuration indication information, and the first configuration indication information indicates that the network device sends the data channel by using the first configuration information of the multiple pieces of configuration information.

7. The method according to claim 6, wherein the first signaling is a radio resource control (RRC) signaling or downlink control information (DCI).

8. The method according to claim 3, wherein the receiving, by the terminal device, the indication information sent by the network device comprises:
receiving, by the terminal device, a PDCCH sent by the network device through a beam in a second beam group, wherein a second indication field of the PDCCH comprises the indication information, the indication information comprises identification information of the receiving beam corresponding to the data channel, the indication information specifically indicates that the terminal device receives the data channel by using a receiving beam corresponding to the identification information.

9. The method according to claim 1, further comprising:
receiving, by the terminal device, a second signaling sent by the network device, wherein the second signaling comprises second configuration indication information, and the second configuration indication information indicates that the network device sends the data channel by using the second configuration information of the multiple pieces of configuration information.

10. The method according to claim 9, wherein the second signaling is radio resource control (RRC) signaling or downlink control information (DCI).

11. The method according to claim 1, further comprising:
receiving, by the terminal device, a PDCCH sent by the network device, wherein the PDCCH comprises third configuration indication information, and the third configuration indication information indicates configuration information used by the network device for sending a data channel.

12. The method according to claim 4, wherein the at least one piece of data transmission resource mapping information comprises multiple pieces of data transmission resource mapping information, the method further comprises:
receiving, by the terminal device, a PDCCH sent by the network device, wherein the PDCCH comprises a fourth indication field, and the fourth indication field indicates data transmission resource mapping information used by the network device for transmitting the downlink transmission channel.

13. The method according to claim 2, wherein the receiving, by the terminal device, the indication information sent by the network device comprises:
receiving, by the terminal device, a PDCCH sent by the network device through a beam in a fifth beam group, wherein a fifth indication field of the PDCCH comprises the indication information, the indication information comprises a number for the transmitting beam corresponding to the data channel in a sixth beam group, the indication information specifically indicates that the network device sends the data channel by using the transmitting beam corresponding to the number in the sixth beam group, and the fifth beam group is a beam group associated with the sixth beam group;
the determining, by the terminal device, the receiving beam corresponding to the downlink transmission channel according to the indication information comprises:
determining, by the terminal device, a receiving beam corresponding to the transmitting beam according to the transmitting beam corresponding to the number; and
receiving the data channel through the receiving beam corresponding to the transmitting beam.

14. The method according to claim 1, further comprising:
receiving, by the terminal device, the multiple pieces of configuration information sent by the network device.

15. A network device, comprising a processor and a memory storing instructions thereon, the processor when executing the instructions, being configured to:
control a transceiver to send indication information to a terminal device, wherein the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information comprises at least one of: information of at least one transmitting beam, information of a receiving beam corresponding to the at least one transmitting beam, and resource mapping information, wherein the resource mapping information indicates a resource available or unavailable for downlink transmission of the at least one transmitting beam; and
transmit the downlink transmission channel through the beam corresponding to the downlink transmission channel,.

wherein the downlink transmission channel comprises a data channel, the beam corresponding to the downlink transmission channel comprises a transmitting beam corresponding to the data channel, and the processor is further configured to:

control the transceiver to send a physical downlink control channel (PDCCH) to the terminal device through a beam in a third beam group, wherein a third indication field of the PDCCH comprises the indication information, the indication information comprises a number for the transmitting beam corresponding to the data channel in a fourth beam group, the indication information specifically indicates that the network device sends the data channel by using the transmitting beam corresponding to the number in the fourth beam group, second configuration information of the multiple pieces of configuration information corresponds to the fourth beam group, the second configuration information is configuration information pre-configured by the network device for the terminal device to receive the data channel.

16. The network device according to claim 15, wherein each piece of configuration information corresponds to one beam group, and information of each transmitting beam among the information of the at least one transmitting beam comprises at least one of the following:

identification information of each transmitting beam, resource occupying information specific to each transmitting beam, and a number for each transmitting beam in the beam group corresponding to each piece of configuration information.

17. The network device according to claim 15, wherein the information of the receiving beam corresponding to the at least one transmitting beam comprises identification information of the receiving beam corresponding to the at least one transmitting beam.

18. The network device according to claim 15, wherein the resource mapping information comprises at least one piece of data transmission resource mapping information, each piece of data transmission resource mapping information indicates a resource available or unavailable for downlink transmission of the at least one transmitting beam.

19. The network device according to claim 16, wherein the processor is further configured to control a transceiver to:

send a PDCCH to the terminal device through a beam in a first beam group, wherein a first indication field of the PDCCH comprises the indication information, the indication information comprises a number for the transmitting beam corresponding to the data channel, the indication information specifically indicates that the network device sends the data channel by using the transmitting beam corresponding to the number in the first beam group, first configuration information of the multiple pieces of configuration information corresponds to the first beam group, the first configuration information is configuration information pre-configured by the network device for the terminal device to receive the data channel.

20. A terminal device, comprising a processor and a memory storing instructions thereon, the processor when executing the instructions, being configured to:

control a transceiver to receive indication information sent by a network device, wherein the indication information indicates a beam corresponding to a downlink transmission channel determined by the network device from multiple pieces of configuration information, the beam corresponding to the downlink transmission channel is used to transmit the downlink transmission channel, and each piece of the multiple pieces of configuration information comprises at least one of: information of at least one transmitting beam, information of a receiving beam corresponding to the at least one transmitting beam, and resource mapping information, wherein the resource mapping information indicates a resource available or unavailable for downlink transmission;

determine a receiving beam corresponding to the downlink transmission channel according to the indication information; and control the transceiver to receive the downlink transmission channel through the receiving beam corresponding to the downlink transmission channel, wherein the downlink transmission channel comprises a data channel, the beam corresponding to the downlink transmission channel comprises a transmitting beam corresponding to the data channel, and the processor is further configured to:

control the transceiver to receive a physical downlink control channel (PDCCH) sent by the network device through a beam in a third beam group, wherein a third indication field of the PDCCH comprises the indication information, the indication information comprises a number for the transmitting beam corresponding to the data channel in a fourth beam group, the indication information specifically indicates that the network device sends the data channel by using the transmitting beam corresponding to the number in the fourth beam group, second configuration information of the multiple pieces of configuration information corresponds to the fourth beam group, the second configuration information is configuration information pre-configured by the network device for the terminal device to receive the data channel.

21. The terminal device according to claim 20, wherein each piece of configuration information corresponds to one beam group, and information of each transmitting beam among the information of the at least one transmitting beam comprises at least one of the following:

identification information of each transmitting beam, resource occupying information specific to each transmitting beam, and a number for each transmitting beam in the beam group to which each transmitting beam belongs.

22. The terminal device according to claim 20, wherein the information of the receiving beam corresponding to the at least one transmitting beam comprises identification information of the receiving beam corresponding to the at least one transmitting beam.

23. The terminal device according to claim 20, wherein the resource mapping information comprises at least one piece of data transmission resource mapping information, each piece of data transmission resource mapping information indicates a resource available or unavailable for downlink transmission of the at least one transmitting beam.

24. The terminal device according to claim 21, wherein the processor is further configured to:

control the transceiver to receive a PDCCH sent by the network device through a beam in a first beam group, wherein a first indication field of the PDCCH comprises the indication information, the indication information comprises a number for the transmitting beam corresponding to the data channel, the indication information specifically indicates that the network device sends the data channel by using the transmitting beam corresponding to the number in the first beam group, first configuration information of the multiple pieces of configuration information corresponds to the first beam group, the first configuration information is configuration information pre-configured by the network device for the terminal device to receive the data channel;

determine a receiving beam corresponding to the transmitting beam according to the transmitting beam corresponding to the number; and control the transceiver to: receive the data channel through the receiving beam corresponding to the transmitting beam.

25. The terminal device according to claim 24, wherein the processor is further configured to:

control the transceiver to receive a first signaling sent by the network device, wherein the first signaling comprises first configuration indication information, and the first configuration indication information indicates that the network device sends the data channel by using the first configuration information of the multiple pieces of configuration information.

26. The terminal device according to claim 25, wherein the first signaling is a radio resource control (RRC) signaling or downlink control information (DCI).

27. The terminal device according to claim 22, wherein the downlink transmission channel comprises a data channel, the beam corresponding to the downlink transmission channel comprises a receiving beam corresponding to the data channel, and the processor is further configured to:

control the transceiver to receive a PDCCH sent by the network device through a beam in a second beam group, wherein a second indication field of the PDCCH comprises the indication information, the indication information comprises identification information of the receiving beam corresponding to the data channel, the indication information specifically indicates that the terminal device receives the data channel by using a receiving beam corresponding to the identification information.

28. The terminal device according to claim 20, wherein the processor is further configured to:

control the transceiver to receive a second signaling sent by the network device, wherein the second signaling comprises second configuration indication information, and the second configuration indication information indicates that the network device sends the data channel by using the second configuration information of the multiple pieces of configuration information.

29. The terminal device according to claim 28, wherein the second signaling is a radio resource control (RRC) signaling or downlink control information (DCI).

30. The terminal device according to claim 20, wherein the processor is further configured to:

control the transceiver to receive a PDCCH sent by the network device, wherein the PDCCH comprises third configuration indication information, and the third configuration indication information indicates configuration information used by the network device for sending a data channel.

31. The terminal device according to claim 23, wherein the at least one piece of data transmission resource mapping information comprises multiple pieces of data transmission resource mapping information, and the processor is further configured to:

control the transceiver to receive a PDCCH sent by the network device, wherein the PDCCH comprises a fourth indication field, and the fourth indication field indicates data transmission resource mapping information used by the network device for transmitting downlink transmission channel.

32. The terminal device according to claim 21, wherein the downlink transmission channel comprises a data channel, the beam corresponding to the downlink transmission channel comprises the transmitting beam corresponding to the data channel, and the processor is further configured to:

control the transceiver to receive a PDCCH sent by the network device through a beam in a fifth beam group, wherein a fifth indication field of the PDCCH comprises the indication information, the indication information comprises a number for the transmitting beam corresponding to the data channel in a sixth beam group, the indication information specifically indicates that the network device sends the data channel by using the transmitting beam corresponding to the number in the sixth beam group, and the fifth beam group is a beam group associated with the sixth beam group.

33. The terminal device according to claim 20, wherein the processor is further configured to:

control the transceiver to receive the multiple pieces configuration information sent by the network device.

* * * * *